F. J. MACHALSKE.
ELECTRODE.
APPLICATION FILED JUNE 27, 1913.
1,099,558.
Patented June 9, 1914.
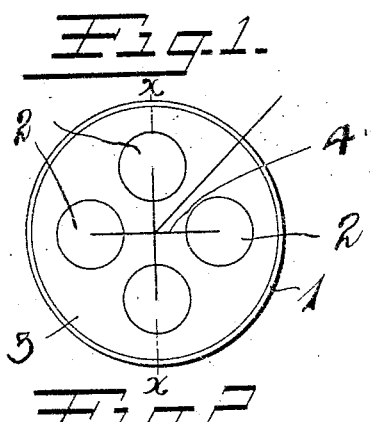
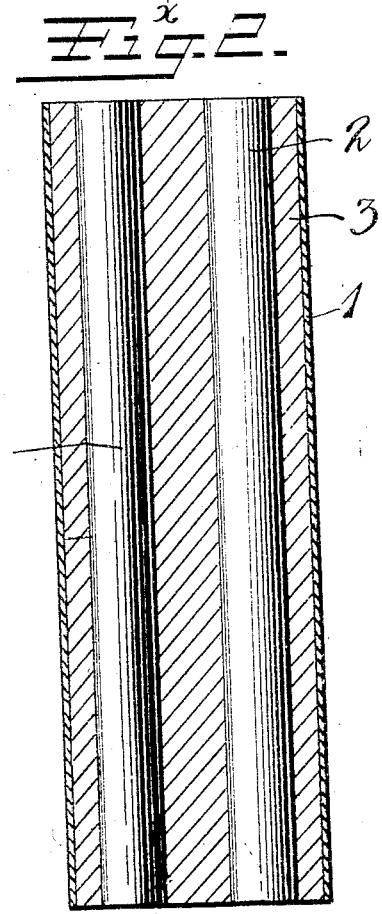

UNITED STATES PATENT OFFICE.

FLORENTINE J. MACHALSKE, OF PLATTSBURG, NEW YORK, ASSIGNOR, BY MESNE ASSIGNMENTS, TO AMERICAN FERROLECTRIDE CORPORATION, OF PLATTSBURG, NEW YORK, A CORPORATION OF NEW YORK.

ELECTRODE.

1,099,558.        Specification of Letters Patent.        Patented June 9, 1914.

Application filed June 27, 1913. Serial No. 776,157.

*To all whom it may concern:*

Be it known that I, FLORENTINE J. MACHALSKE, a citizen of the United States, residing at Plattsburg, Clinton county, New York, have invented certain new and useful Improvements in Electrodes, of which the following is a full, clear, and exact description.

My invention relates to improvements in electrodes for smelting furnaces, and has for its object to provide an electrode which shall supply current through a large area and at the same time shall not have a large area of carbon.

It further has for its object to provide an electrode which shall be largely composed of slag-producing material.

The following is a description of an embodiment of my invention, reference being had to the accompanying drawings, in which—

Figure 1 is a plan view of an electrode embodying my invention, and Fig. 2 is a longitudinal section of the same on the line $x$—$x$ Fig. 1.

Referring more particularly to the drawings, 1 is a casing, preferably sheet iron.

2 is a plurality of carbon rods within said casing. These rods may be of ordinary carbon or may be of artificial graphitic carbon or graphite, the former being preferred on account of cheapness. Within the casing, and filling the spaces around the carbon rods, is a filler 3 of magnesium oxid, or, as found in a state of nature, dolomite, calcium-magnesium carbonate ($MgCaC_2O_6$). This magnesium oxid, before being placed in the casing, is mixed with a suitable binder, such as hot tar or silicate of soda, only enough of the binder being used to form the oxid into a cohering mass. The oxid with its binder is tamped in place within the casing so as to form a solid mass, and after the casing is filled, the electrode is baked so as to expel all the moisture therefrom. The carbon rods are provided with suitable electric connections 4 at one end so that they can be connected to a source of electric current.

In operation, the electrode is used in an electric smelting furnace in the ordinary way, the lower end of the electrode being applied to the charge. As the current is supplied to the electrode, it passes through the carbon rods, heating their lower ends to incandescence and heating the surrounding magnesium oxid also to incandescence. Magnesium oxid, as is well known, is a refractory magnesium compound and has the peculiar property of becoming a conductor of comparatively low resistance when highly heated. The lower end of the electrode, as a whole, therefore, becomes incandescent as the current passes, and forms an incandescent area of relatively large extent in contact with the charge. Moreover, the incandescent portion of the electrode is very largely composed of magnesium oxid ("dolomite" $CaMgC_2O_6$) and only to a small extent composed of carbon so that there is little carbon exposed to the molten metal at any time. Moreover, the lower ends of the carbon rods, as they are heated, become automatically converted by the electric current into artificial graphite, which is not substantially acted upon by the molten metal or dissolved thereby. A minimum amount of carbon is, therefore, introduced into the molten metal by reason of the use of my electrodes. Moreover, the magnesium oxid ("dolomite" $CaMgC_2O_6$) is a slag-forming compound, so that the heat supplied is practically always supplied through slag and the carbon in the electrode is practically kept out of contact with the molten metal and the carburizing of the metal is reduced to a minimum.

What I claim is:

1. In an electrode for smelting furnaces, the combination of a refractory magnesium compound of relatively high conductivity when heated, and carbon, the magnesium compound providing the major portion of the conducting surface.

2. In an electrode for smelting furnaces, the combination of a refractory magnesium compound of relatively high conductivity when heated, and graphite, the magnesium compound providing the major portion of the conducting surface.

3. In an electrode for smelting furnaces, the combination of a refractory magnesium compound of relatively high conductivity when heated, and carbon closely associated therewith, the latter forming a conducting path extending lengthwise of said electrode.

4. In an electrode for smelting furnaces, the combination of a refractory magnesium compound of relatively high conductivity when heated, and a carbon rod closely associated therewith, the latter forming a conducting path extending lengthwise of said electrode.

5. In an electrode for smelting furnaces, the combination of a refractory magnesium compound of relatively high conductivity when heated, and a plurality of carbon rods closely associated therewith, the latter forming conducting paths extending lengthwise of said electrode and embedded in said magnesium compound.

6. In an electrode for smelting furnaces, the combination of a refractory magnesium compound of relatively high conductivity when heated, and a plurality of carbon rods associated therewith, the latter forming conducting paths extending lengthwise of said electrode.

7. In an electrode for smelting furnaces, the combination of a refractory magnesium compound of relatively high conductivity when heated, and carbon closely associated therewith, the latter forming a conducting path extending lengthwise of said electrode, and a sheath surrounding the magnesium compound and carbon.

8. In an electrode for smelting furnaces, the combination of a refractory magnesium compound of relatively high conductivity when heated, and a plurality of electrically connected carbon rods associated therewith, the latter forming conducting paths extending lengthwise of said electrode.

9. In an electrode for smelting furnaces, the combination of a refractory magnesium compound of relatively high conductivity when heated, a plurality of electrically connected carbon rods associated therewith, the latter forming conducting paths extending lengthwise of said electrode, and a sheath surrounding the magnesium compound and carbon rods.

FLORENTINE J. MACHALSKE.

Witnesses:
W. H. CLARK,
T. G. HOYT.